M. MATHY.
GLASS POT FURNACE.
APPLICATION FILED JUNE 26, 1919.

1,369,453.

Patented Feb. 22, 1921.

Inventor.
Maurice Mathy

By Laurence Langner
Attorney.

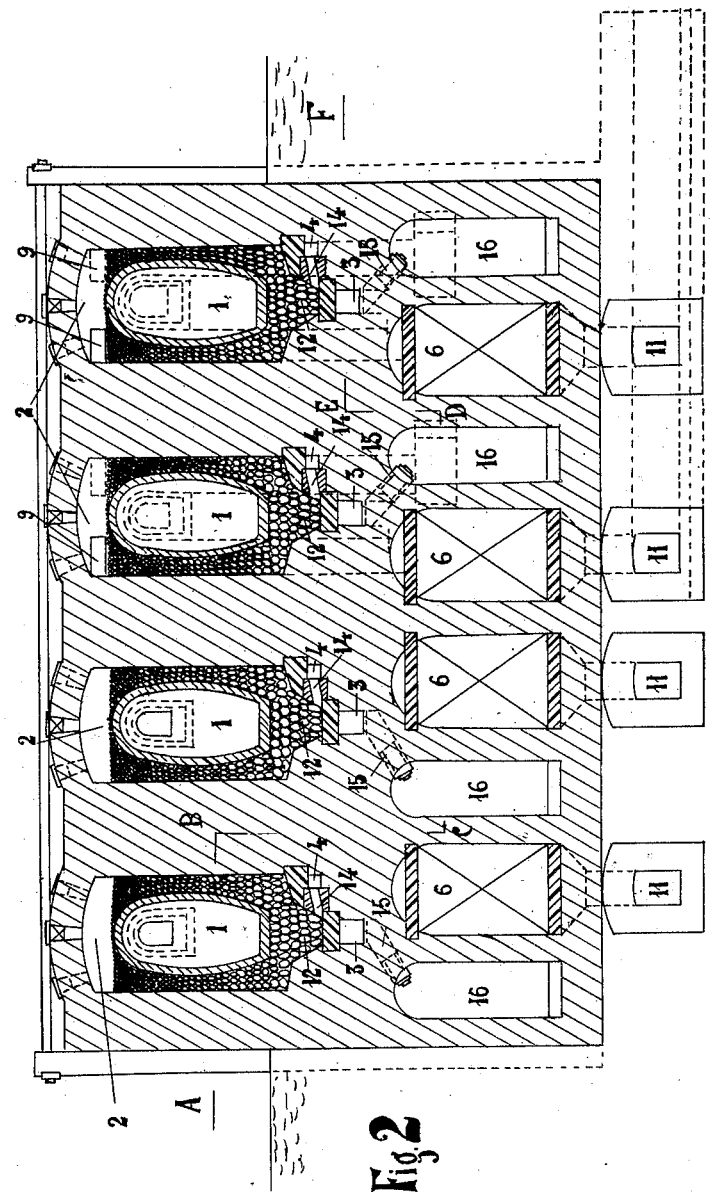

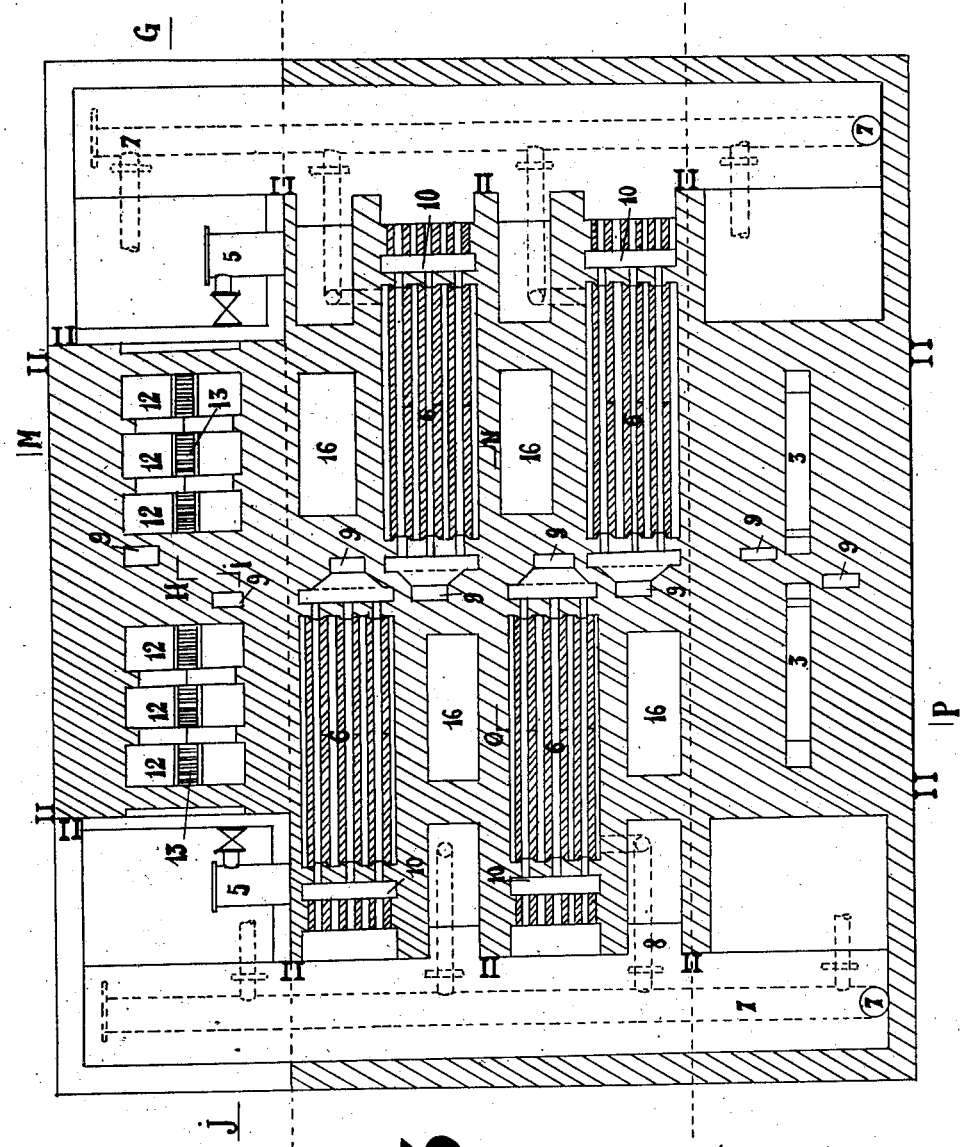

UNITED STATES PATENT OFFICE.

MAURICE MATHY, OF LIÈGE, BELGIUM.

GLASS-POT FURNACE.

1,369,453.  Specification of Letters Patent.  Patented Feb. 22, 1921.

Application filed June 26, 1919. Serial No. 307,033.

*To all whom it may concern:*

Be it known that I, MAURICE MATHY, manufacturer, a subject of the King of Belgium and resident of Liège, in the Kingdom of Belgium, have invented certain new and useful Improvements in Glass-Pot Furnaces; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

This invention has for its object to provide an improved crucible furnace or oven for glass making, heated by flameless combustion. Each crucible is placed in a separate chamber and is surrounded with the refractory porous material necessary for carrying into effect this system of heating. These crucible chambers are arranged in two rows along the two longer sides of the furnace or oven.

The foundation of the furnace or oven comprises regenerators; one regenerator for each crucible chamber.

By the side of each of these regenerators a cavity is formed so arranged as to receive the contents of a charge in the case of a crucible breaking.

The accompanying drawings illustrate by way of example a constructional form of this invention. In these drawings:

Fig. 2 is a longitudinal vertical section on the line M—N—O—P of Fig. 3.

Fig. 3 is a horizontal section on the line A—B—C—D—E—F of Fig. 2.

Figure 1:
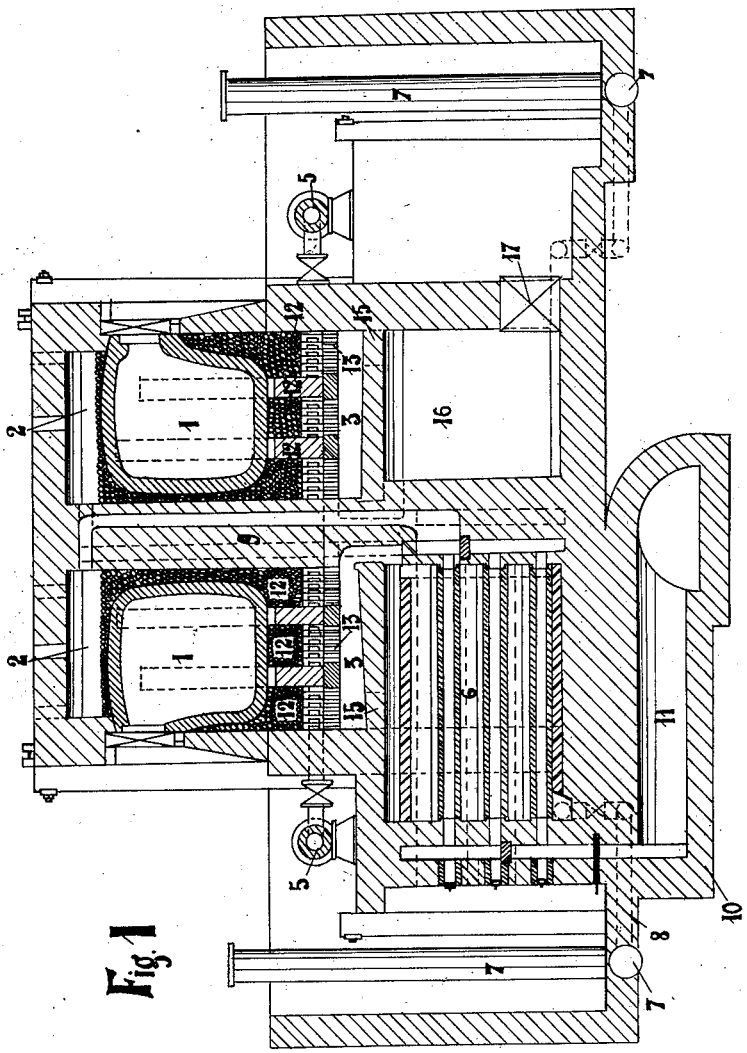
Figure 1 is a vertical cross section on the line G—H—I—J of Fig. 3.

In Fig. 3, for the sake of clearness and in order to show better the system of supplying the air and gas, it is assumed that the crucibles and their surrounding porous refractory material have been removed.

The crucibles 1 are placed in chambers 2 in two series of four each in the example shown.

Under each chamber 2 there are provided air ducts 3 and gas ducts 4. The gas is supplied through an external duct 5. The air is supplied from a regenerator 6. This regenerator may be of any suitable type. The air enters therein through a pipe 8 coming from the duct 7. It is heated by gases of combustion drawn from the upper part of the chamber by means of a flue 9. After having passed through the regenerator the gases of combustion pass through a vertical flue 10 into the duct 11 that conveys them to the chimney.

This regenerator and these various ducts and flues are provided as usual with the requisite dampers and registers for the purpose of regulation, and if required of cutting off any one of the regenerators.

The mixture of air and gases for each chamber 2 is produced in the following manner: In the floor of each chamber there are formed three cavities 12 having inclined walls terminating at the transverse apertures 13 formed in the air duct 3. The gas duct 4 communicates with the bottom of these cavities through orifices 14 formed in one of the aforesaid inclined walls. These cavities are filled with fragments of porous refractory materials similar to those surrounding the crucible.

The air and gas mix together at the bottom of these cavities, and their combustion which commences near the top of said cavities, is continued throughout the mass of fragments surrounding the crucible.

In the case of an accidental breakage of a crucible the mass of molten glass which it contains flows through these cavities 12, then through the apertures 13, and passes into the air duct 3. This duct communicates through a special passage 15 with the glass-hole 16. This passage 15 is closed by a thin plate of fusible alloy. Immediately the mass of molten glass enters this passage, this plate melts, and the mass of molten glass is able to escape freely into the glass-hole 16, whence it is removed through the aperture 17.

What I claim is:

A crucible glass furnace or oven comprising a plurality of separate crucible chambers, the bottom of each chamber being formed with cavities, a crucible in each chamber, fragments of porous refractory material surrounding the crucible and filling said cavities, gas and air supply ducts at the bases of said cavities, a regenerator for each chamber for effecting the heating of the air for combustion, a plurality of glass-holes, a duct connecting each of said glass-holes with the air supply duct of one of the chambers, and fusible closing means in said connecting ducts.

In testimony whereof I affix my signature in presence of two witnesses.

MAURICE MATHY.

Witnesses:
 LEONARD LERA,
 GEORGES VANDER HAEGHEN.